United States Patent [19]

Dardenne et al.

[11] Patent Number: 4,758,840
[45] Date of Patent: Jul. 19, 1988

[54] MEANS FOR CALIBRATING THE ELEVATION AND AZIMUTH ANGLES OF THE SCAN AXIS OF AN ANTENNA

[75] Inventors: Jean Dardenne, Gif Sur Yvette; Patrick Deschamps, Ramonville; Jacques Marty, Portet, all of France

[73] Assignee: Centre National d'Etudes Spatiales, Paris, France

[21] Appl. No.: 24,043

[22] Filed: Mar. 10, 1987

[30] Foreign Application Priority Data

Mar. 11, 1986 [FR] France ................... 86 03427

[51] Int. Cl.⁴ .................. H01Q 3/00; G01S 13/00
[52] U.S. Cl. .................... 342/359; 342/75; 342/77
[58] Field of Search ........... 342/350, 359, 165, 173, 342/174, 73, 74, 75, 76, 77

[56] References Cited

U.S. PATENT DOCUMENTS 3,924,235 12/1975 Heller et al. .................... 342/75
4,199,257 4/1980 Dosch .

FOREIGN PATENT DOCUMENTS 0007831 4/1979 European Pat. Off. .
1616709 10/1963 Fed. Rep. of Germany .
8015251 7/1980 France .

OTHER PUBLICATIONS

Raumfahrtforschung, vo. 6, 1982, p. 265.
IEEE Int'l Convention Record, vol. 11, No. 5, 1963, p. 234.
Funkschau, vol. 2, 1976.

Primary Examiner—Theodore M. Blum
Assistant Examiner—Gregory C. Issing
Attorney, Agent, or Firm—Michael N. Meller

[57] ABSTRACT

The invention relates to a means for calibrating the elevation and azimuth angles of the scan axis of an antenna. Said means comprises a mobile target remote from the antenna, a video approach camera for detecting the mobile target, a theodolite equipped with a telescope having a reticule with two crossed designating axes, a video camera for the acquisition of the reticule image and images supplied by the telescope, means for controlling the guidance of the displacement of the target, so that the latter is positioned at a predetermined distance from the antenna in the vicinity of the scan axis, so that the image of the target in the telescope is as close as possible to the reticule axes. Said means also comprises a radio wave transmitter on board the target initiated or started when the image of the target enters the optical field of the approach camera and means for recording, during the operation of the on-board transmitter, the images of the target with respect to the reticule axes and for recording the corresponding values of the elevation and azimuth angles supplied by the measuring means.

7 Claims, 1 Drawing Sheet

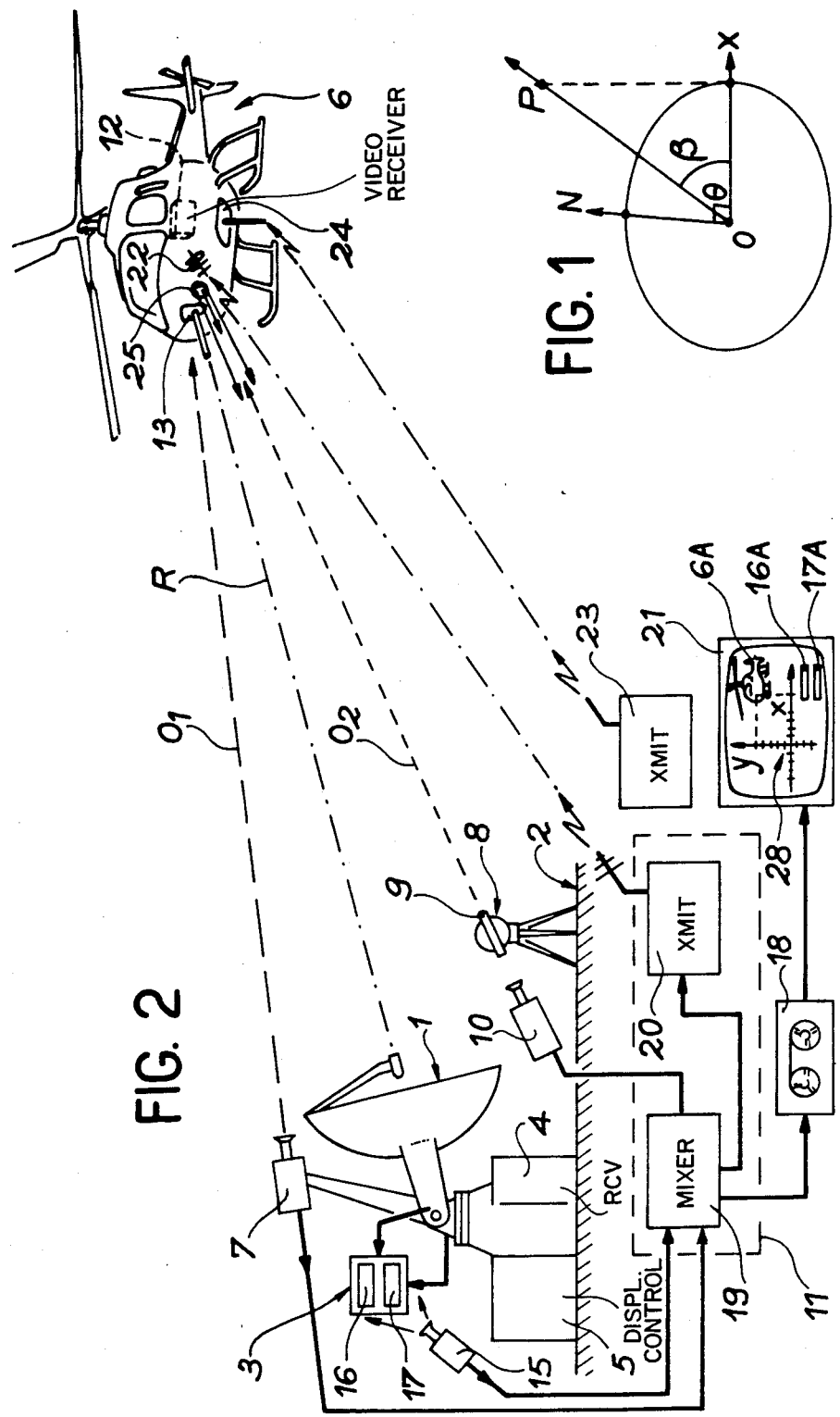

MEANS FOR CALIBRATING THE ELEVATION AND AZIMUTH ANGLES OF THE SCAN AXIS OF AN ANTENNA

BACKGROUND OF THE INVENTION

The present invention relates to a means for calibrating the elevation and azimuth angles of the scan or radio axis of an antenna. It more particularly applies to the calibration of the elevation and azimuth angles of the scan axis of an antenna to be directed at a geostationary satellite occupying a predetermined position in space with respect to a fixed reference mark linked with the ground carrying the antenna.

FIG. 1 permits a better understanding of the definition of the elevation and azimuth angles of a point P in space occupying a predetermined position, said position being observed from a terrestrial point O.

The azimuth angle $\theta$ of a point P in space observed from a point O linked with the ground is the angle between a reference direction ON (e.g. the direction of the geographical north) and the straight intersection line OX between a vertical plane passing through P and through O and perpendicular to the horizontal ground. The elevation angle $\beta$ is the angle between the line passing through O and P and the aforementioned line OX.

Different processes or apparatuses exist for orienting the scan axis of an antenna with relatively great precision towards a point which, with respect to a fixed reference mark linked with the ground, occupies a predetermined position in space. These processes or apparatuses are particularly used for accurately directing the scan axis of an antenna on the predetermined position to be occupied by a geostationary satellite.

Different methods are known for performing angular elevation and azimuth measurements of a point in space and for orienting an antenna relatively accurately towards said point in space.

The angular elevation and azimuth measurements can be performed either by an optical method or by radio methods.

The optical method consists of using a telescope equipped with a camera which can e.g. photograph a satellite illuminated by the sun against a background of stars. The position of the satellite is detected by elevation and azimuth angles calculated from the positions of said satellite with respect to the stars, whose coordinates are perfectly known. This method is subject to constraints because viewing can only take place at the start and end of the night. Cloudiness must be very limited and it takes a long time to analyze the measurements.

Radio methods consist of using interferometry or performing a direct angular measurement. The method using interferometry consists, on the basis of the measurement of the phase displacements existing at all points of a particular antenna array, of restoring the direction from which the radio wave was transmitted by a source, whose elevation and azimuth angles it is wished to detect. With this direction detected, the antenna can then be directed towards the thus detected source. This method requires a large amount of equipment (several antennas with associated signal processing equipment). The method consisting of performing a direct angular measurement utilizes a directional antenna mounted on a support which moves along two orthogonal axes, e.g. the azimuth and elevation axes. It is easy to carry out this method, but its accuracy is dependent on the accuracy of the mechanical means which move the antenna.

The description of these various methods makes it clear that it is necessary to calibrate the measurements of the elevation and azimuth angles of the scan axis of an antenna, so that for each angle the angular error occurring during the measurements of said angles will be known, in order to correct the antenna direction when the antenna is directed at a point in space occupying predetermined positions in a fixed reference mark.

Different calibration methods exist. For example, it is known to use a collimation mast and this constitutes a widely used calibration method. In this method, use is made of a pylon which is provided with a radio beacon at its top, the transmission frequency of which corresponds to the reception frequency of the calibrated antenna. This pylon is also equipped with a sighting mark permitting its precise optical location from the antenna. It is easy to use, but it is only possible to calibrate the orientation of the antenna when the site is very low with all the resulting error sources and particular errors due to multiple reflections. It is not possible to use this process for calibrating an antenna with a limited displacement.

It is also possible to calibrate the measurements of elevation and azimuth angles of a radio axis of an antenna by using radio sources. The shortcoming of this method is that the radio source has an apparent diameter generally exceeding the sought measuring accuracy. Thus, the apparent diameter of a radio source is close to $2.10^{-3}$ radians, whereas the sought precision on directing an antenna at a geostationary satellite is close to $5.10^{-4}$ radians. This method cannot be used for an antenna with a limited displacement, due to the fact that the probability of finding a usable radio source in the antenna pointing direction is very limited.

It is also possible to carry out a calibration from a satellite. In this case, it is necessary to find a satellite having a beacon frequency which is identical or very close to the tracking frequency of the antenna to be calibrated. It is also necessary to know the position of the satellite with a much greater precision than the sought calibration precision. Finally, for an antenna with limited displacement, the problem mentioned in connection with a radio source occurs, i.e. that of having a satellite in the pointing direction and this is rarely the case.

The object of the present invention is to obviate the disadvantages of known devices for calibrating measurements of elevation and azimuth angles of the scan axis of an antenna and particularly aims at providing a calibration means for said angles which is much more accurate than existing means, which does not require the use of a large amount of equipment or extensive calculations and which makes it possible to very accurately calibrate the orientations of radio antennas with a limited displacement. The calibration accuracy obtained is less than $5.10^{-6}$ radians, which is much better than in existing equipment.

SUMMARY OF THE INVENTION

The invention relates to a means for calibrating the elevation and azimuth angles of the scan axis of an antenna, said angles being determined by measuring means with respect to a fixed reference mark linked with the ground carrying the antenna, said antenna having transmission and reception means and displacement control means so that it can be directed excepting the elevation and azimuth errors, towards a predetermined remote position in space, designated in elevation and azimuth with respect to the reference mark and designated in distance with respect to the antenna, wherein it comprises a mobile target remote from the antenna, a video approach camera for detecting the mobile target, said approach camera being mobile with respect to the antenna and having an optical axis close to the radio axis, a theodolite whose optical axis is strictly directed in accordance with the elevation and azimuth of the predetermined position, said theodolite being provided with a telescope having a reticule with two crossed axes for designating its optical axis, with two crossed marking axes of its optical axis, a video camera for the acquisition of the image of the reticule and images supplied by the telscope, means for controlling the guidance of the displacement of the target, so that the latter is positioned at a predetermined distance from the antenna in the vicinity of the scan axis, the approach and acquisition cameras being connected to guidance control means of the displacement of the target, so that the latter is positioned in the optical field of the theodolite, in such a way that the image of the target in the telescope is as close as possible to the axes of the reticule, a radio wave transmitter on-board the target and transmitting at a frequency corresponding to the antenna reception frequency, the operation of said transmitter being initiated when the image of the target enters the optical field of the approach camera, the antenna reception means being connected to means for the control of the displacement of said antenna, so that the direction of the scan axis is made dependent on the position of the on-board transmitter and means connected to the guidance control means of the target displacement for recording during the operation of the on-board transmitter, the images of the target with respect to the axes of the reticule and for recording the corresponding values of the elevation and azimuth angles supplied by the measuring means, the pointing errors in elevation and in azimuth being calculated from values of corresponding angles supplied by the measuring means and from corresponding coordinates of the images of the target with respect to the axes of the reticule.

According to another feature, the target is a piloted aircraft, the guidance control means of the target displacement comprising means for mixing the video signals supplied by the approach and acquisition cameras and means for transmitting said video signals, connected to the mixing means, a video receiver with screen on-board the aircraft for receiving the signal supplied by the transmission means and corresponding to the images supplied by the approach and acquisition cameras, the pilot of the aircraft observing the images on the screen and controlling the displacement of the aircraft so that the latter firstly remains in the optical field of the approach camera and then so that the image of the aircraft on the screen is as close as possible to the axes of the reticule, when the aircraft is in the optical field of the theodolite.

According to another feature, the approach camera is a wide-angled, incorporated zoom camera.

According to another feature, the means comprises a light source on-board the aircraft and visible by the approach camera and the theodolite, said source facilitating the tracking of the aircraft by the approach camera and the directing thereof by the theodolite.

According to another feature, the means has radiophonic transmission—reception means on the ground and on board the aircraft.

According to another feature, the aircraft is a helicopter.

BRIEF DESCRIPTION OF THE DRAWINGS

The invention is described in greater detail hereinafter relative to non-limitative embodiments and the attached drawings, wherein:

FIG. 1, already described is, a diagram making it possible to define the elevation and azimuth angles of a point in space seen from a point on the ground.

FIG. 2 diagrammatically shows a calibration means according to the invention.

DETAILED DESCRIPTION OF THE PREFERRED EMBODIMENTS

The means shown in FIG. 2 make it possible to calibrate the values of the elevation and azimuth angles of the scan axis R of an antenna 1, which is e.g. to be directed towards a predetermined position in space remote from the antenna. This predetermined position can e.g. be that of a geostationary satellite (not shown in the drawing).

This position can be designated by its distance with respect to the antenna, as well as by its elevation and azimuth angles in a fixed reference mark (described in FIG. 1), linked with the ground 1 carrying the antenna, the origin of said mark corresponding to the location of the antenna.

The elevation and azimuth angles of the scan axis of the antenna are determined in known manner by measuring means 3 connected to not shown antenna movement sensors.

The antenna also has known radio reception and transmission means 4, which are not shown in detail in the drawing. The control means 5 are also constructed in known manner and make it possible to move the antenna in elevation and in azimuth so that the antenna is directed excepting the elevation and azimuth errors, towards the predetermined remote position in space, designated in elevation and azimuth by measuring means 3.

The calibration means comprises a mobile target 6, such as an aircraft and more particularly a helicoptor and which is mobile at a distance from the antenna. The means also comprises a video approach camera 7, which makes it possible to designate the mobile target and moves with the antenna. It is integral therewith and its optical axis $O_1$ is very close to the scan axis R of the antenna. The approach camera is of the "wide-angled, incorporated zoom" type. As will be shown hereinafter, it makes it possible to follow the helicopter when the latter, leaving ground 2, moves and is located at a certain distance from the antenna in a position substantially adjacent to the scan axis R.

The calibration means also comprises a theodolite 8, whose optical axis $O_2$ is strictly directed in accordance with the elevation and azimuth of the predetermined position to be aimed at (e.g. geostationary satellite). This theodolite is equipped with a telescope 9 having a reticule with two crossed axes for designating its optical axis. A video acquisition camera 10 makes it possible to obtain images of the reticule, as well as images supplied by the telescope, as will be shown hereinafter. Thus, the theodolite supplies images of the helicopter 6, when the latter is in the vicinity of optical axis $O_2$.

The calibration means also comprises control means 11, 12 for guiding the displacement of the target and which will be explained hereinafter. These guidance control means make it possible to guide the displacement of the helicopter, so that at a predetermined distance from the antenna, it is positioned in the vicinity of scan axis R. These guidance control means in particular comprise a video receiver 12 on board the helicopter and whose function will be described in greater detail hereinafter.

The control means 11 are connected to the approach and acquisition cameras 7, 10 and, by means of the on-board video receiver 12, make it possible to guide the displacement of the helicopter, so that the latter is positioned by the pilot in the field of the theodolite, so that its image in the telescope is as close as possible to the axes of the reticule.

A radio wave transmitter 13 is located on the target and transmits at a frequency corresponding to the reception frequency of the antenna. The reception means 4 of antenna 1 are connected to the antenna displacement control means 5, so that the direction of scan axis R is dependent on the position of the on-board transmitter 13, when the latter transmits radio signals.

Recording means 18 are connected to the target displacement control means 11 to record, as will be shown hereinafter, the image of the target with respect to the axes of the reticule (said image being supplied by the acquisition camera 10) and for recording for corresponding values of the elevation and azimuth angles supplied by the measuring means 3.

The directing errors of the antenna with respect to elevation and in azimuth are calculated on the basis of the values of corresponding angles supplied by measuring means 3 and on the basis of the corresponding coordinates of the images of the target with respect to the axes of the reticule.

The recording means comprise a measuring video camera 15 connected to the control means 11 and directed towards the digital display measuring means 3. These measuring means supply in a first zone 16, e.g., the numerical value of the azimuth angle and in a second zone 17, the numerical value of the elevation angle. The recording means also comprise a magnetoscope 18 connected to control means 11.

Control means 11 comprise video signal mixing means 19 connected to the approach, acquisition and measuring cameras 7, 10, 15, as well to magnetoscope 18. These mixing means are also connected to a video transmitter 20.

Upon putting the on-board transmitter 13 into operation, magnetoscope 18 records the images supplied by camera 10 of the reticule 28 of the theodolite telescope 9, images 6a of helicopter 6, as well as images 16a, 17a of the numerical values of the elevation and azimuth angles supplied by the measuring camera 15. This magnetoscope can be connected to a video receiver with control screen 21 on which these images appear during calibration but, as will be explained hereinafter, also at the time of analyzing the measurements. The on-board video receiver 12 receives the same images. The video receiver 20 supplies video signals corresponding to the images supplied by the approach 10 and acquisition 10 cameras. These signals are intercepted by an on-board antenna 22 and are transmitted to the video receiver 12 of the displacement guidance control means.

The calibration means also comprises radiophonic transmission—reception means 23, 24 respectively located on the ground and on board the helicopter, so as to permit a radiophonic exchange between a ground operator and the helicopter pilot, particularly for guiding the pilot towards the position to be reached during an approach phase.

Finally, the guidance control means comprises a light source 25 on board the helicopter and which is visible to the approach and acquisition cameras. This light source facilitates the tracking of the aircraft or helicopter by the approach camera, as well as the detection of the helicopter in the theodolite telescope.

The aforementioned means functions as follows. It is wished to point antenna 1 in a direction R in space (toward a geostationary satellite, whose distance and elevation and azimuth angles are known) with respect to the antenna. The antenna is placed in a position such that the direction of its scan axis R is adjacent, in elevation and in azimuth, to that of the satellite to be accurately pointed. The positioning of the antenna in said direction is effected by control and displacement means 5. The elevation and azimuth angles are designated by measuring means 3, excepting errors. Theodolite 8, which is a very accurate apparatus, is very precisely oriented in the direction (designated in elevation and in azimuth with respect to the aforementioned reference mark) of the satellite with which the antenna will subsequently exchange radio signals. The cameras are started and the helicopter, which was on the ground, takes off under the control of the pilot, who can communicate with an operator on the pilot, who can communicate with an operator on the ground by radiophonic transmission—reception means 23, 24. The pilot knows the direction (in azimuth and in elevation) and the distance with respect to the antenna of the measuring point in air space where the helicopter must be located to be positioned along the optical axis of theodolite 8. This auxiliary point is strictly located in the antenna—satellite direction. The distance from the helicopter to the antenna is in fact designated in known manner by the altitude of said helicopter. Thus, upon knowing the elevation angle with respect to the antenna of the auxiliary point to be reached, for positioning at a predetermined distance from the antenna, it is merely necessary to locate the helicopter at a predetermined altitude for the considered elevation angle. Thus, if the antenna is a parabola of diameter D, the helicopter distance with respect to the antenna must exceed $2D_2/\lambda$, $\lambda$ designating the wavelength of the signals transmitted by the helicopter towards the antenna. This condition is necessary for a good reception by the antenna of the radio waves transmitted by the on-board transmitter 13.

The helicopter, after reaching the predetermined auxiliary point in air space, which is designated in distance, elevation and azimuth, then enters the field of approach camera 7, which has a wide-angle incorporated zoom. The designation of the helicopter is facilitated by light source 25. When the helicopter enters the field of approach camera 7, the on-board transmitter 13 transmits radio signals. These signals are received by the reception means 4 which, in conjunction with the displacement control means 5, make it possible to make the position of the antenna dependent in elevation and azimuth in such a way that the scan axis R is constantly directed towards the transmitting antenna of the on-board transmitter 13. On video receiver 12, the pilot receives the images of the helicopter supplied by approach camera 7. These images are supplied via mixing means 19 and the video transmitter 20. When the helicopter reaches a position close to the predetermined auxiliary point (designated in distance, elevation and azimuth) with respect to the antenna, the image of the helicopter can then be seen in telescope 9 of theodolite 8. Camera 10 films these images of the helicopter in the theodolite telescope and also the image of the theodolite. These images are transmitted to the video receiver 12 on board the helicopter via mixing means 19 and video transmitter 20. They are simultaneously recorded by magnetoscope 18, which also simultaneously records the corresponding values of the elevation and azimuth angles of the antenna, supplied by measuring means 3, filmed by camera 15. The pilot then sees on the screen video receiver 12, the image of the helicopter with respect to the reticule, as well as a the values of the elevation and azimuth angles.

These images are comparable to those which would be subsequently seen during the reading of the recording tape of the magnetoscope 18 on the screen of video receiver 21. On said screen it is possible to see the image 6a of the helicopter, the image 28 of the axes of the reticule, as well as the images 16a, 17a of the numerical values displayed by measuring means 3. These values correspond to the values of the elevation and azimuth angles. Bearing in mind the image of the helicopter on the screen of the on-board receiver 12, the pilot guides the helicopter so that its image on the screen of the video receiver 12 is as close as possible to the reticule axes. Thus, the intersection point of these axes determines the optical axis $O_2$ of telescope 9 of theodolite 8 and consequently the precise direction of the satellite at which the antenna is aimed. Having recorded on the tape of magnetoscope 18 these successive images, as well as the corresponding values of the elevation and azimuth angles of the antenna, the helicopter can then return to base.

The ground operators can then carry out error calculations on the antenna elevation and azimuth angles, on the basis of data resulting from the analysis of the images recorded on the magnetoscope tape. Thus, for each image the exact position (coordinates X and Y) of the image of the helicopter with respect to the axes of the reticule is known. It is consequently possible, on the basis of these coordinates of the helicopter image with respect to the reticule axes, to calculate the angle between the reference direction defined by theodolite axis $O_2$ and the direction of the scan axis R of the antenna. The reference direction is defined by the intersection point of the reticule axes, whereas the scan axis direction is defined by coordinates X, Y of its image on the screen. It is therefore possible to accurately calculate the values of the antenna azimuth and elevation angles with respect to the reference mark.

Each image includes images 16a and 17a of the elevation and azimuth angle values supplied by the measuring means 3. A comparison between the reference values of the elevation and azimuth angles calculated in the aforementioned manner (on the basis of coordinates X, Y of the aircraft with respect to the reticule axes) and the values indicated by the measuring means makes it possible to obtain the angle corrections to be performed to obtain the positioning of the antenna in elevation and azimuth, in order that is can be directed very accurately at the geostationary satellite in space. Thus, it is possible to very accurately calibrate the elevation and azimuth measuring means 3 because, as a result of this means, the antenna can be directed in elevation and azimuth with angle errors below 50 microradians.

The theodolite is positioned as close as possible to the rotation center of the antenna to minimize the parallax erros between the scan axis of the antenna and the optical axis of the theodolite. Simple trigonometric calculations which can be carried out by a practitioner of ordinary skill in the art make it possible to calculate this parallax error.

The means described hereinbefore makes it possible to orient an antenna with a much greater accuracy than that obtained with the previously described systems.

What is claimed is:

1. A means for calibrating the elevation and azimuth angles of the scan axis of an antenna, said angles being determined by measuring means with respect to a fixed reference mark linked with the ground carrying the antenna, said antenna having transmission and reception means and displacement control means so that it can be directed, excepting the elevation and azimuth errors, towards a predetermined remote position in space, designated in elevation and azimuth with respect to the reference mark and designated in distance with respect to the antenna, wherein said means comprises a video approach camera for detecting a mobile target located remote from the antenna, said approach camera being mobile with respect to the antenna and having an optical axis close to the scan axis, a theodolite whose optical axis is strictly directed in accordance with the elevation and azimuth of the predetermined remote position, said theodolite being provided with a telescope having a reticule with two crossed axes for designating the optical axis of said telescope with two crossed marking axes of its optical axis, a video camera for the acquisition of the image of the reticule and images supplied by the telescope, guidance control means for controlling the guidance of the displacement of the mobile target, whereby the mobile target is positioned at a predetermined distance from the antenna in the vicinity of the scan axis, the approach and acquisition cameras being connected to the guidance control means, whereby the mobile target is positioned in the optical field of the theodolite, in such a way that the image of the target in the telescope is as close as possible to the axes of the reticule, a radio wave transmitter for mounting onboard the target and transmitting at a frequency corresponding to the antenna reception frequency, the operation of said transmitter being initiated when the image of the target enters the optical field of the approach camera, the antenna reception means being connection to means for controlling the displacement of said antenna, whereby the direction of the scan axis is made dependent on the position of the transmitter, and recording means connected to the guidance control means for recording, during operation of the transmitter, the images of the target with respect to the axes of the reticule and for recording the corresponding values of the elevation and azimuth angles supplied by the measuring means, the directing errors in elevation and in azimuth being calculated from values of corresponding angles supplied by the measuring means and from corresponding coordinates of the images of the target with respect to the axes of the reticule.

2. The calibrating means according to claim 1, wherein the target is a piloted aircraft, the guidance control means comprises means for mixing the video signals supplied by the approach and acquisition cameras and means for transmitting said video signals, connected to the mixing means, a video receiver with screen mounted on-board the aircraft for receiving the signals supplied by the transmission means, these signals corresponding to the images supplied by the approach and acquisition cameras, the pilot being able to control the displacement of the aircraft to remain in the optical field of the approach camera and then ensure that the image of the aircraft on the screen is as close as possible to the axes of the reticule in dependence on the images observed on the screen, when the aircraft is in the optical field of the theodolite.

3. The calibrating means according to claim 2, wherein the recording means comprise a measuring camera directed towards the digital display measuring means, said camera being connected to mixing means and to a magnetoscope connected to the mixing means for recording the numerical values of the elevation and azimuth angles supplied by the measuring means and for recording the corresponding images of the reticule and the target supplied by the acquisition camera.

4. Calibrating means according to claim 3, wherein the approach camera is of the wide-angled, incorporated zoom type.

5. The calibrating means according to claim 4, wherein the guidance control means also comprise a light source on board the aircraft and visible to the approach camera and theodolite, said light source facilitating the tracking of the aircraft by the approach camera and the directing of the approach camera by the theodolite.

6. The calibrating means according to claim 4, further comprising radiophonic transmission—reception means on the ground and on board the aircraft.

7. Calibrating means according to claim 4, wherein the the aircraft is a helicopter.

* * * * *